(12) United States Patent
Srinivasan et al.

(10) Patent No.: US 12,111,784 B2
(45) Date of Patent: Oct. 8, 2024

(54) NoC BUFFER MANAGEMENT FOR VIRTUAL CHANNELS

(71) Applicant: XILINX, INC., San Jose, CA (US)

(72) Inventors: Krishnan Srinivasan, San Jose, CA (US); Abbas Morshed, Los Altos, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/959,903

(22) Filed: Oct. 4, 2022

(65) Prior Publication Data

US 2024/0111704 A1    Apr. 4, 2024

(51) Int. Cl.
*G06F 13/40*    (2006.01)

(52) U.S. Cl.
CPC ...... *G06F 13/4059* (2013.01); *G06F 13/4022* (2013.01)

(58) Field of Classification Search
None
See application file for complete search history.

(56) References Cited

U.S. PATENT DOCUMENTS

| | | | | |
|---|---|---|---|---|
| 11,482,262 | B1* | 10/2022 | Lee | G11C 7/1048 |
| 2013/0136129 | A1* | 5/2013 | Locatelli | H04L 45/58 |
| | | | | 370/392 |
| 2016/0188529 | A1* | 6/2016 | Nagarajan | G06F 15/781 |
| | | | | 711/151 |
| 2018/0287964 | A1* | 10/2018 | Gray | H04L 49/109 |
| 2022/0067513 | A1* | 3/2022 | Stevens | G06N 3/045 |
| 2022/0188264 | A1* | 6/2022 | Wang | G06F 8/443 |
| 2022/0354017 | A1* | 11/2022 | Heydari | H05K 7/20281 |
| 2023/0041806 | A1* | 2/2023 | Singh | H04L 63/0428 |
| 2023/0046057 | A1* | 2/2023 | Albright | G09B 29/102 |

* cited by examiner

*Primary Examiner* — Henry Tsai
*Assistant Examiner* — Aurangzeb Hassan
(74) *Attorney, Agent, or Firm* — Patterson + Sheridan, LLP

(57) ABSTRACT

Embodiments herein describe a NoC where its internal switches have buffers with pods that can be assigned to different virtual channels. A subset of the pods in a buffer can be grouped together to form a VC. In this manner, different pod groups in a buffer can be assigned to different VCs (or to different types of NoC data units), where VCs that transmit wider data units can be assigned more pods than VCs that transmit narrower data units.

20 Claims, 15 Drawing Sheets

NoC BUFFER MANAGEMENT FOR VIRTUAL CHANNELS

TECHNICAL FIELD

Examples of the present disclosure generally relate to buffer management for virtual channels (VC) in a network on a chip (NoC).

BACKGROUND

A system on chip (SoC) (e.g., a field programmable gate array (FPGA), a programmable logic device (PLD), or an application specific integrated circuit (ASIC)) can contain a packet network structure known as a network on a chip (NoC) to route data packets between logic blocks in the SoC—e.g., programmable logic blocks, processors, memory, and the like.

The NoC can include ingress logic blocks (e.g., masters) that execute read or write requests to egress logic blocks (e.g., servants). The NoC can include VCs and arbiters to transfer data between switches. In current solutions, a VC is a dedicated buffer per traffic flow that allows non-blocking data transfer. Thus, if the buffer for a first VC in a switch is full, data for a second VC is still able to be received at the switch (assuming the second VC's dedicated buffer is not full). VCs ensure there is no head-of-line blocking on shared wires.

SUMMARY

Techniques for defining pod groups in a NoC are described. One example is an integrated circuit that includes a first hardware logic circuit, a second hardware logic circuit, and a NoC communicatively coupling the first hardware circuit and the second hardware circuit. The NoC includes a plurality of switches, each switch includes a plurality of ports where each port comprising a buffer. Further, the buffer comprises a plurality of pods divided into multiple pod groups assigned to different virtual channels.

Another example is a method that includes receiving a NoC data unit at a port of a switch in a NoC; identifying a virtual channel corresponding to the NoC data unit; storing, in a buffer in the switch, the NoC data unit in a pod group assigned to the virtual channel where the buffer includes a plurality of pods assigned to multiple pod groups for different virtual channels, and updating a pointer for the pod group based on storing the NoC data unit in the pod group.

Another example is an integrated circuit that includes a first hardware circuit, a second hardware circuit, and a NoC communicatively coupling the first hardware circuit and the second hardware circuit. The NoC includes a plurality of switches where each switch includes a plurality of ports and each port has a buffer. Further, the buffer comprises a plurality of pods divided into multiple pod groups assigned to different types of NoC data units.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
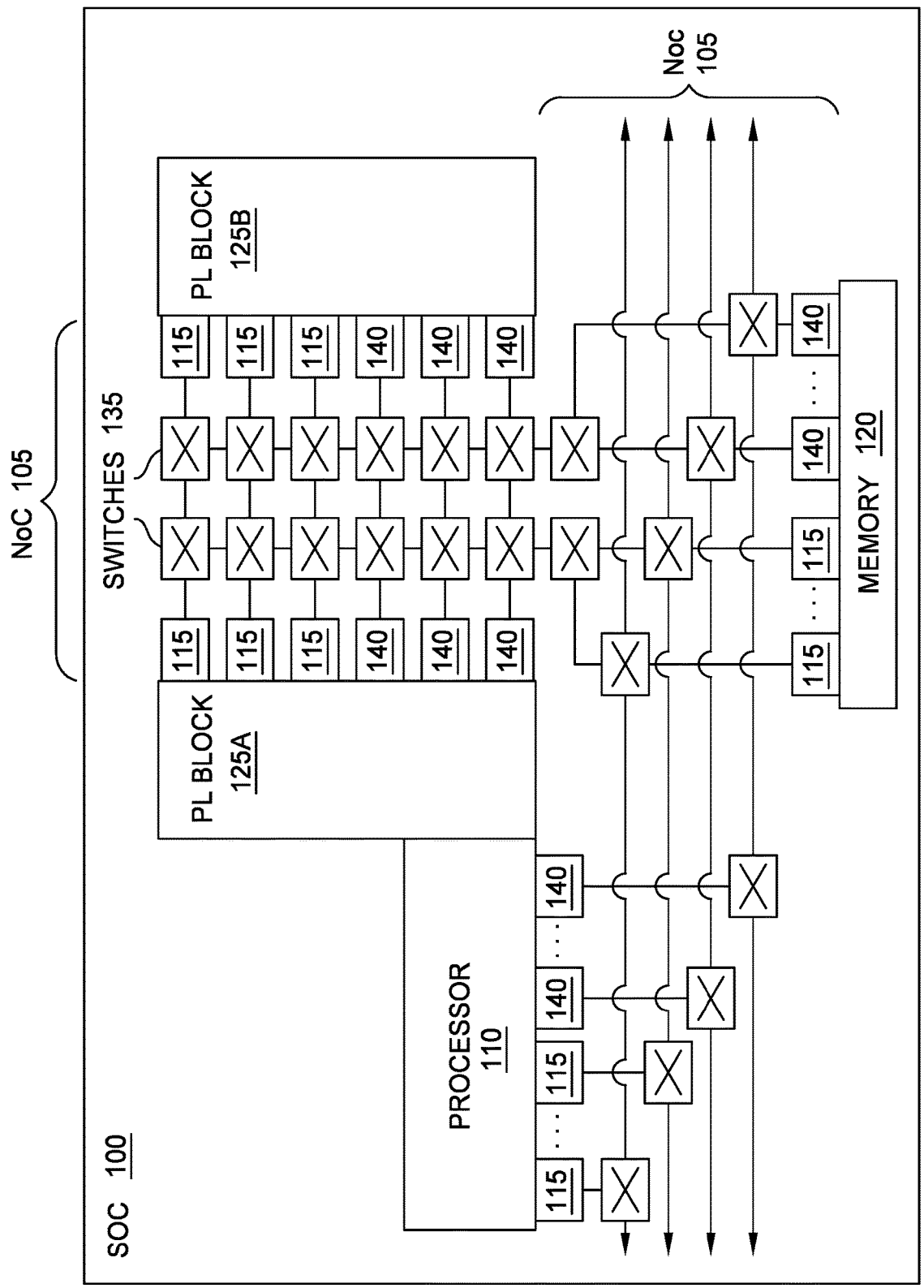
FIG. 1 is a block diagram of a SoC containing a NoC, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a NoC where its internal switches have buffers with pods (e.g., memory elements) that can be assigned to different VCs. A switch typically encounters heterogeneous traffic. Depending on the system requirements, it may be advantageous to allocate more buffer memory to one VC than another. However, traffic flows are typically not uniform in width. While a write response is only about 64 bits wide, a write request can be 400 bits wide or more. In previous solutions, the width of the VC would be as wide as the widest NoC data unit (also referred to as a flit, which can be a portion of a packet). This causes significant wire wastage.

The embodiments herein solve the wire wastage problem by introducing a concept of pods (e.g., a fixed sized memory). Each port in a switch can be assigned a buffer which has a plurality of pods. A subset of the pods in a buffer can be grouped together to form a VC. In this manner, different groups of pods in a buffer can be assigned to different VCs, where VCs that transmit wider data units can be assigned more pods than VCs that transmit narrower data units. Doing so considerably reduces the buffering overhead of the VCs and enables the opportunity for more efficient implementation of redundancy in the system. While the embodiments below describe assigning a buffer with a plurality of pods to each switch, this can also be extend to the entire switch.

FIG. 1 is a block diagram of the SoC 100 containing a NoC 105, according to an example. In one embodiment, the SoC 100 is implemented using a single integrated circuit (IC). In one embodiment, the SoC 100 includes a mix of hardened and programmable logic. For example, the NoC 105 may be formed using hardened circuitry rather than programmable circuitry so that its footprint in the SoC 100 is reduced.

As shown, the NoC 105 interconnects a programmable logic (PL) block 125A, a PL block 125B, a processor 110, and a memory 120. That is, the NoC 105 can be used in the SoC 100 to permit different hardened and programmable circuitry elements in the SoC 100 to communicate. For example, the PL block 125A may use one ingress logic block 115 (also referred to as a NoC Master Unit (NMU)) to communicate with the PL block 125/3 and another ingress logic block 115 to communicate with the processor 110. However, in another embodiment, the PL block 125A may use the same ingress logic block 115 to communicate with both the PL block 125B and the processor 110 (assuming the endpoints use the same communication protocol). The PL block 125A can transmit the data to the respective egress logic blocks 140 (also referred to as NoC Slave Units or NoC Servant Units (NSU)) for the PL block 125B and the processor 110 which can determine whether the data is intended for them based on an address (if using a memory mapped protocol) or a destination ID (if using a streaming protocol).

The PL block 125A may include egress logic blocks 140 for receiving data transmitted by the PL block 125B and the processor 110. In one embodiment, the hardware logic blocks (or hardware logic circuits) are able to communicate with all the other hardware logic blocks that are also connected to the NoC 105, but in other embodiments, the hardware logic blocks may communicate with only a sub-portion of the other hardware logic blocks connected to the NoC 105. For example, the memory 120 may be able to communicate with the PL block 125A but not with the PL block 125B.

As described above, the ingress and egress logic blocks 115, 140 may all use the same communication protocol to communicate with the PL blocks 125, the processor 110, and the memory 120, or can use different communication protocols. For example, the PL block 125A may use a memory mapped protocol to communicate with the PL block 125B while the processor 110 uses a streaming protocol to communicate with the memory 120. In one embodiment, the NoC 105 can support multiple protocols.

In one embodiment, the SoC 100 is an FPGA which configures the PL blocks 125 according to a user design. That is, in this example, the FPGA includes both programmable and hardened logic blocks. However, in other embodiments, the SoC 100 may be an ASIC that includes only hardened logic blocks. That is, the SoC 100 may not include the PL blocks 125. Even though in that example the logic blocks are non-programmable, the NoC 105 may still be programmable so that the hardened logic blocks—e.g., the processor 110 and the memory 120 can switch between different communication protocols, change data widths at the interface, or adjust the frequency.

In addition, FIG. 1 illustrates the connections and various switches 135 (labeled as boxes with "X") used by the NoC 105 to route packets between the ingress and egress logic blocks 115 and 140.

The locations of the PL blocks 125, the processor 110, and the memory 120 in the physical layout of the SoC 100 are just one example of arranging these hardware elements. Further, the SoC 100 can include more hardware elements than shown. For instance, the SoC 100 may include additional PL blocks, processors, and memory that are disposed at different locations on the SoC 100. Further, the SoC 100 can include other hardware elements such as I/O modules and a memory controller which may, or may not, be coupled to the NoC 105 using respective ingress and egress logic blocks 115 and 140. For example, the modules may be disposed around a periphery of the SoC 100.

Figure 2:
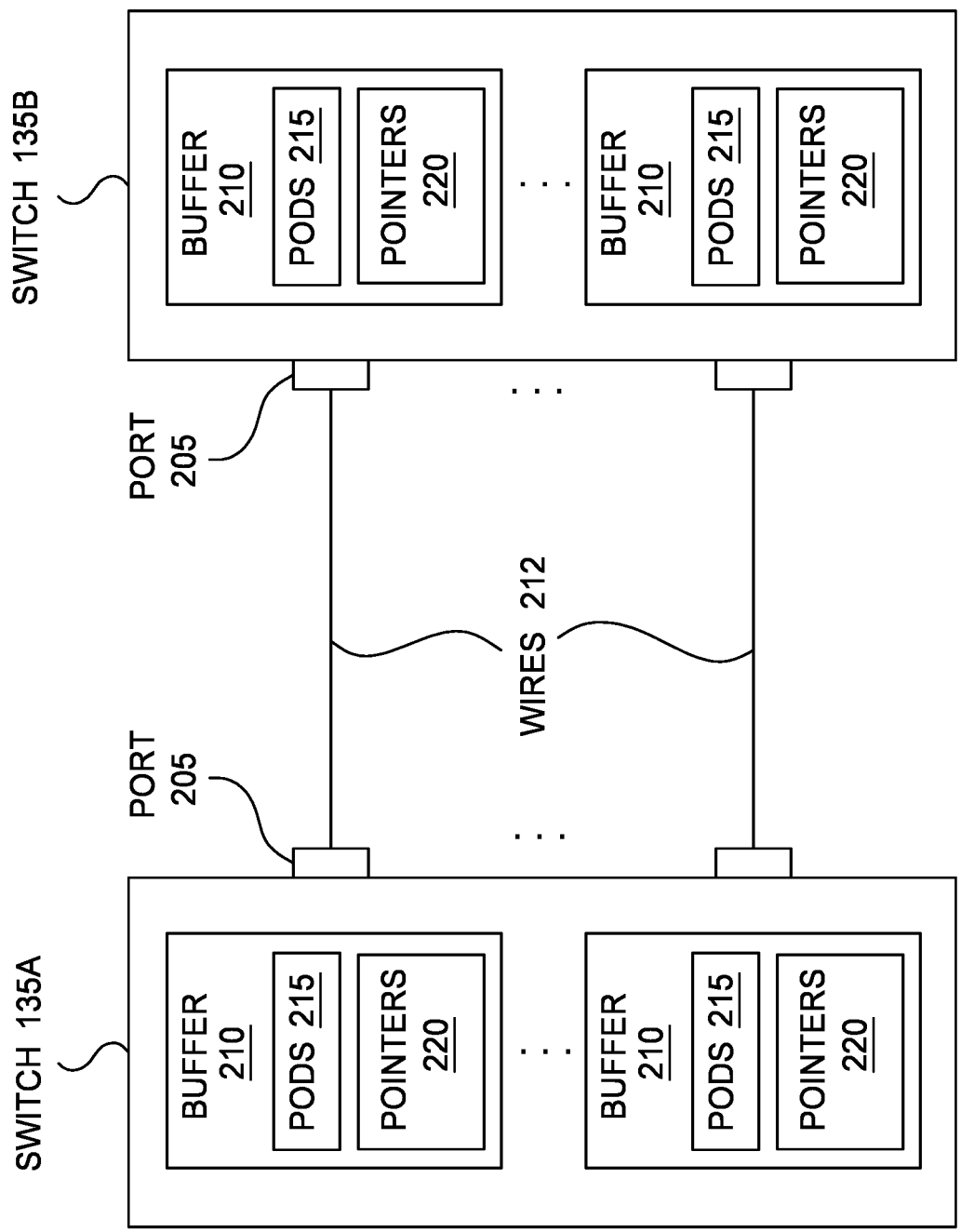
FIG. 2 illustrates NoC switches with pods that are assignable to VCs, according to an example.

FIG. 2 illustrates NoC switches 135 with pods that are assignable to VCs, according to an example. FIG. 2 illustrates two NoC switches 135A and 135B that are connected via ports 205. That is, the NoC can include one or more wires 212 between the ports 205. In one embodiment, packets received at the NoC are divided up into NoC data units (also referred to as flints) which are then transmitted between the switches 135 until reaching their destination.

Each of the ports 205 have a dedicated buffer 210 for receiving the data units. Each buffer 210 includes a plurality of pods 215. In one embodiment, a pod 215 is a fixed-size memory. In one embodiment, all the pods 215 in a buffer 210 may have the same size (e.g., 64 bits). In one embodiment, the size of the pods 215 may be set according to the size of the smallest NoC data unit. For example, the switches 135 may exchange NoC data units that range from 64 bits to 400 bits. If the size of the pod 215 is set to the smallest data unit, when a switch 135 receives a larger data unit, it is stored in multiple pods 215. However, using the size of the smallest NoC data unit to set the size of the pods 215 is just one example. In other embodiments, the size of the pods 215 can be set using traffic profiles.

As discussed above, the NoC may use VCs to enable non-blocking data transfer of the data units. In one embodiment, each type of NoC data unit is assigned to a different VC. For example, NoC data units corresponding to read requests, read response, write requests, and writes responses may be assigned to four different VCs. Thus, if a switch 135 receives a large influx of read requests (a first VC), it does not prevent the switch 135 for receiving NoC data units corresponding to read responses (a second VC).

However, instead of assigning a dedicated buffer or FIFO to each VC for each port 205 of the switch 135, the VCs are allocated pod groups within the buffer 210 for each port. However, because each VC may use NoC data units with different widths, wider width VCs may be assigned more pods than VCs that have data units with narrower widths.

To manage allocating different numbers of the pods 215 to the VCs, the buffers 210 includes pointers 220 that can point to the different pod groups. In one embodiment, the buffers 210 can store a pointer for each VC. That way, the switches 135 can use the pointers 220 to store received NoC data units in only their assigned pod group. Further, the pointers 220 can be used to track when a pod group is full so additionally received NoC data units in that VC can be rejected.

Figure 3:
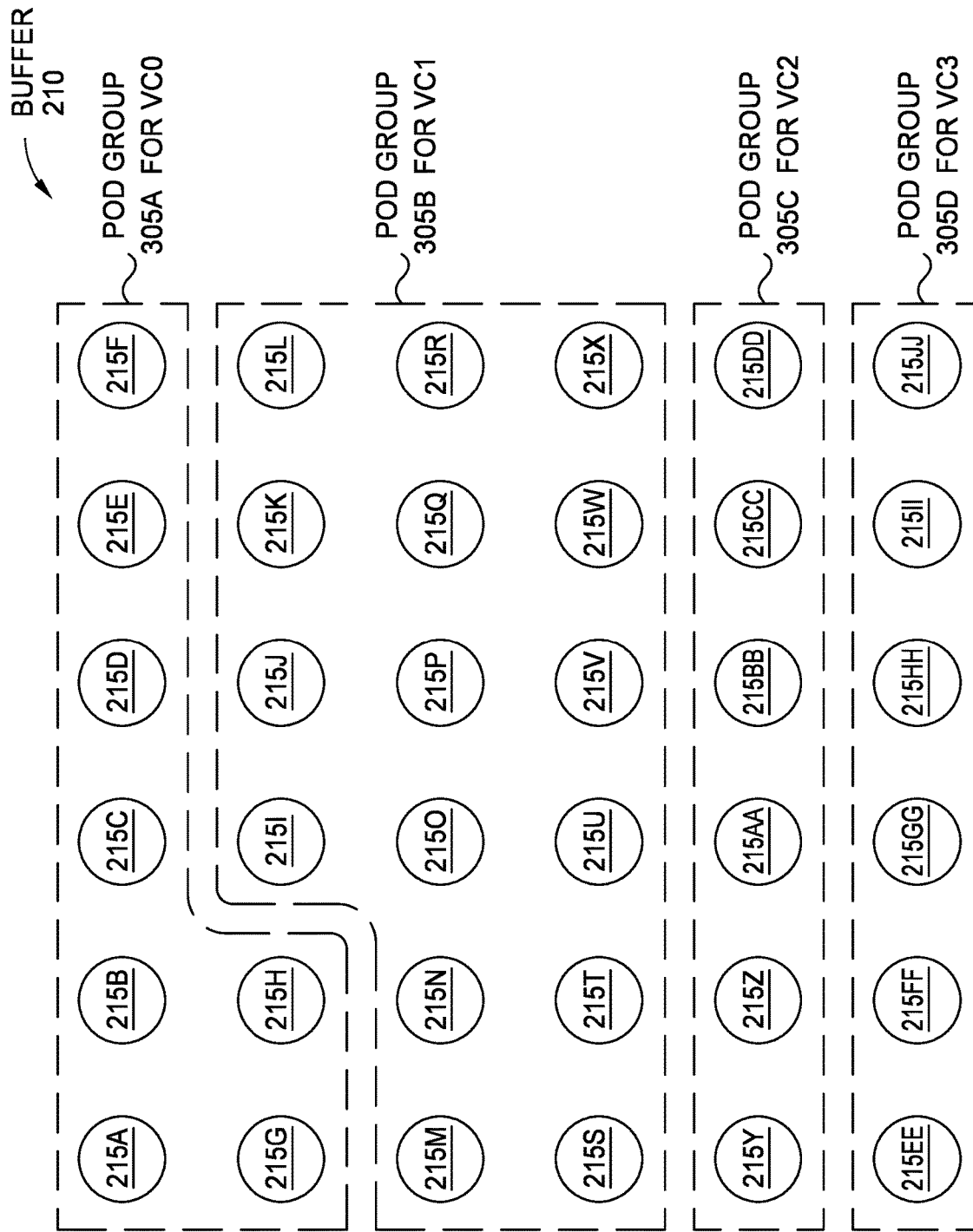
FIG. 3 illustrates assigning pods in a buffer to different VCs, according to an example.

FIG. 3 illustrates assigning pods 215 in a buffer 210 to different VCs, according to an example. In this example, the pods 215 in the buffer 210 are divided into four pod groups 305 for four VCs—i.e., VC0-VC3. In one embodiment, the wider width VCs are assigned more pods than smaller width VCs. As shown, the pod group 305A is assigned pods 215A-215H (i.e., 8 pods), the pod group 305B is assigned pods 215I-215X (i.e., 15 pods), the pod group 305C is assigned pods 215Y-215DD (i.e., 6 pods), and the pod group 305D is assigned pods 215EE-215JJ (i.e., 6 pods).

However, FIG. 3 is just one non-limiting example of assigning pods 215 to pod groups 305, which can vary depending on the specific implementation. Further, while the buffer 210 is shown to have 36 pods, each buffer 210 can include any number of pods.

In one embodiment, each different type of NoC data unit is assigned to a VC, where each VC is assigned a pod group 305. As a non-limiting example, advanced extensible interface (AXI) supports write request (and data), read response, read request, and write response, which can be assigned to four different VCs. In one embodiment, the write response is approximately 64 bits wide, which is the smallest of the four data units while the write request (and its accompanying data) can be 410 bits wide. In one embodiment, the size of each pod 215 is set to the width of the smallest NoC data units (64 bits in this example) (e.g., the smallest width NoC data unit).

Figure 4:
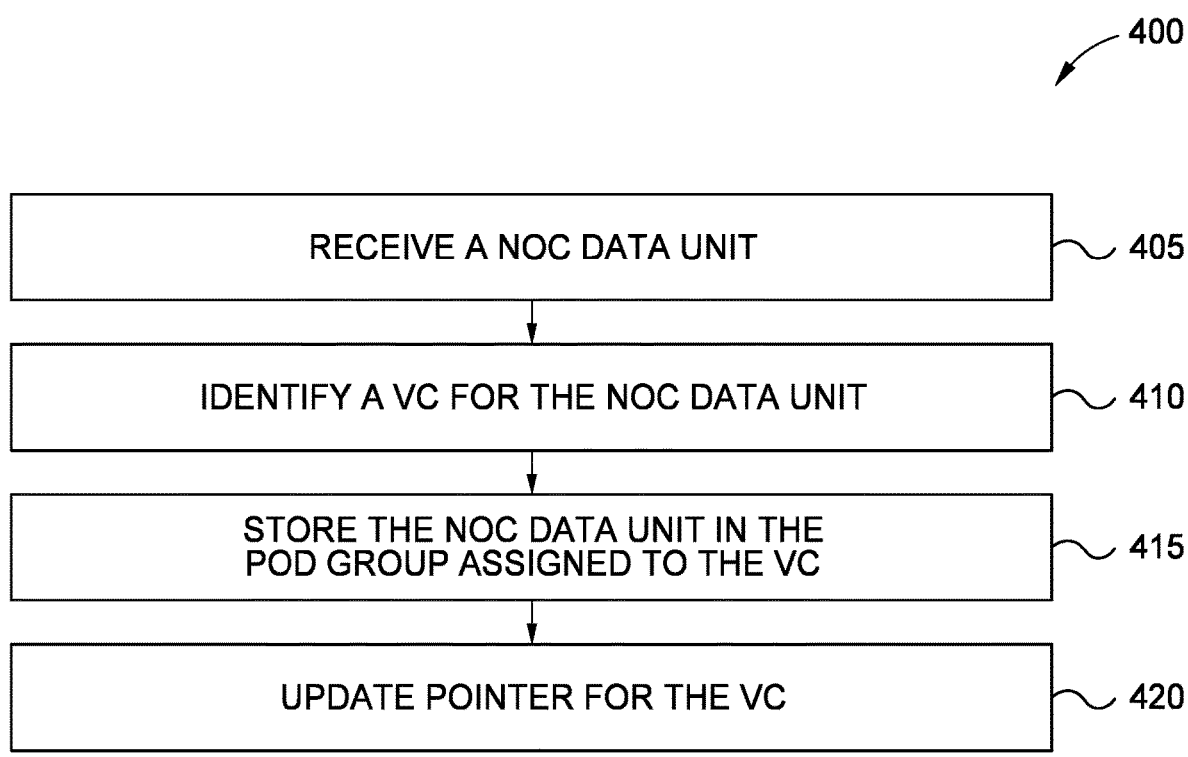
FIG. 4 is a flowchart for storing NoC data units in a buffer in a NoC switch, according to an example.

FIG. 4 is a flowchart of a method 400 for storing NoC data units in a buffer in a NoC switch, according to an example. At block 405, a NoC data unit is received at a port of a NoC switch (e.g., the port 205 of the switch 135 in FIG. 2). As discussed above, the different types of NoC data units are assigned to different VCs.

At block 410, the switch identifies a VC for the NoC data unit. In one embodiment, the switch identifies the VC for the NoC data unit when decoding the data unit.

However, in one embodiment, instead of assigning each type of NoC data unit to a different VC, there may be one VC (or no VC) in the NoC. Nonetheless, each flit or NoC data unit has a "type" field (RD request, WR response, etc.) that determines the type of the flit. The pod groups can be assigned directly from the type fields where each pod group is assigned to a different type field, rather than to a VC.

At block 415, the switch stores the NoC data unit in the pod group assigned to the VC. If the NoC data unit is larger than a pod, than the switch stores the data unit in multiple pods in the pod group.

Moreover, the method 400 assumes that the pod group has sufficient empty pods. If the pod group does not have sufficient pods to store the NoC data unit, then the switch may reject the data unit.

At block 420, the switch updates the pointer for the VC. For example, the pointer for a particular VC may be updated to point at the last pod storing the data unit, or may point to the next available pod in the pod group. By having a pointer for each VC, the switch can track the next available pod in each pod group in the buffer to know where the next received NoC data unit in that VC should be stored.

Figure 5A:
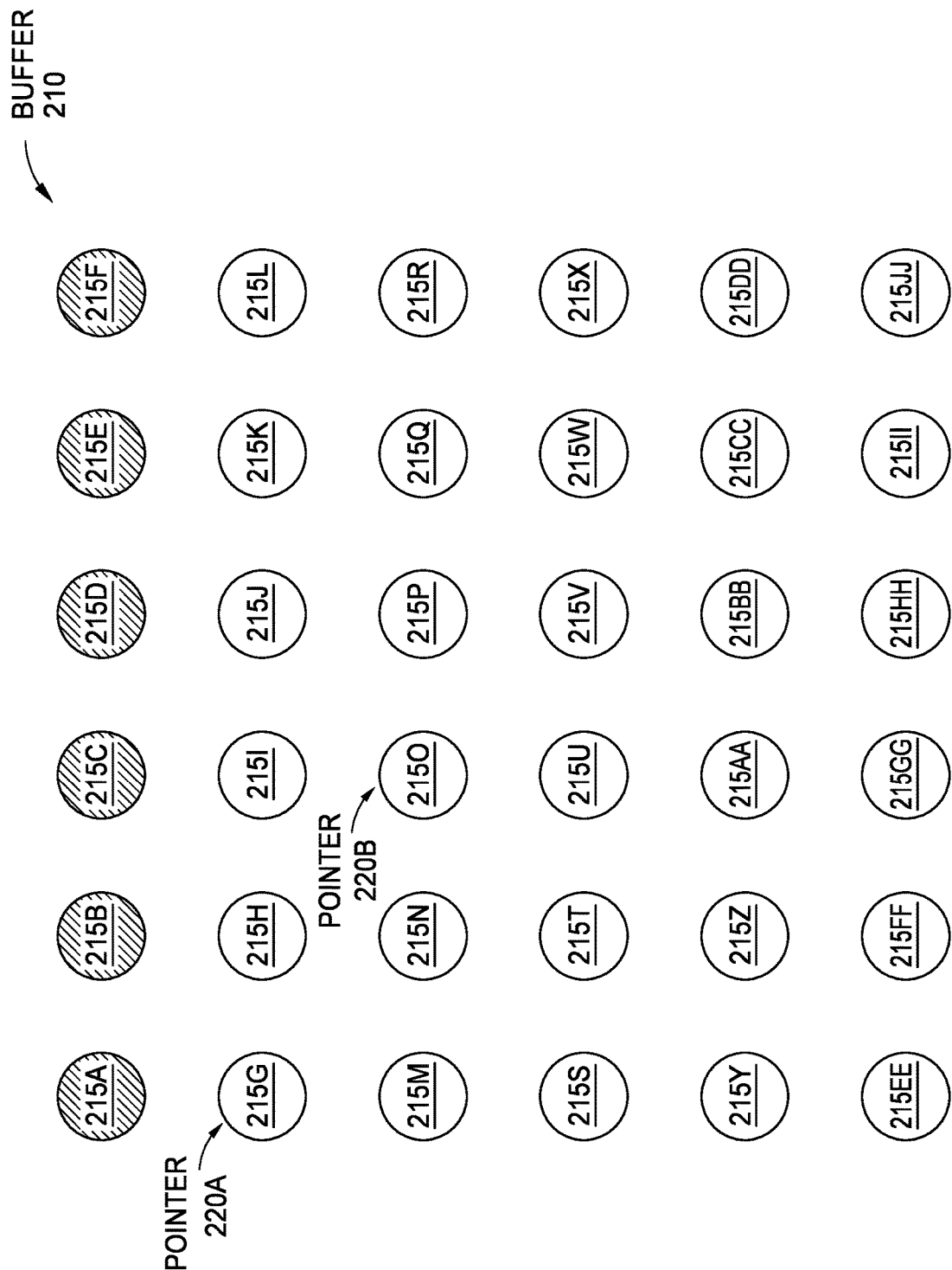
FIGS. 5A-5D illustrate storing data units of different VCs in a buffer, according to examples.

FIGS. 5A-5D illustrate storing data units of different VCs in a buffer, according to examples. FIG. 5A illustrates receiving a first NoC data unit at a port in a switch and storing this data unit in pods 215A-215F. In response, a pointer 220A for the VC corresponding to the first NoC data unit has been updated to point at the next available pod in the pod group. That way, when another NoC data unit in the same VC is received, the pointer 220A indicates where that data unit should be stored.

FIG. 5A also illustrates a pointer 220B for another VC or pod group in the buffer 210, Currently, the buffer 210 does not store any data units for this VC, and thus, the pointer 220E points to the first pod in the corresponding pod group.

Figure 5B:
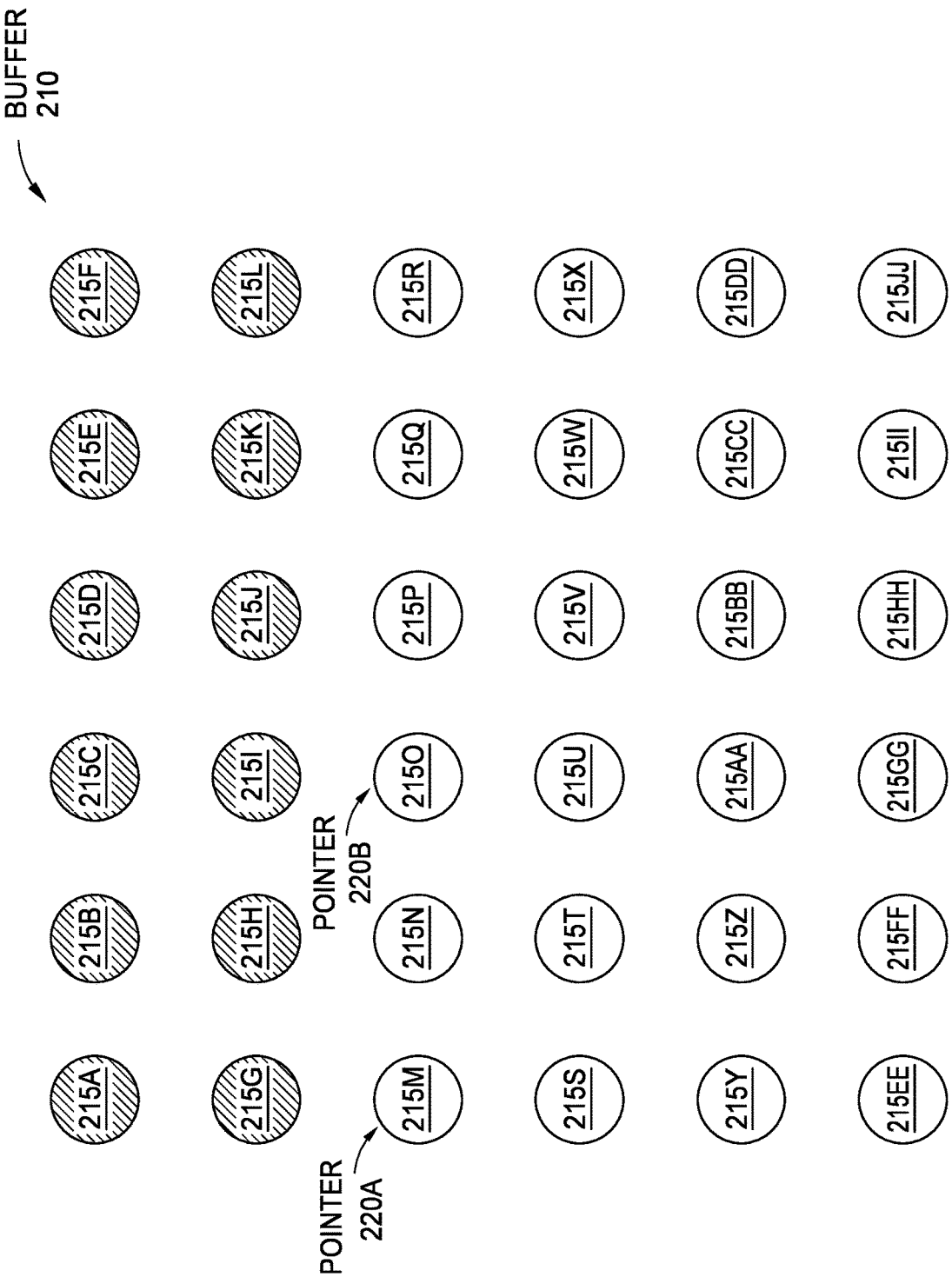

FIG. 5B illustrates receiving a second NoC data unit at the same port in the switch and storing this data unit in pods 215G-215L. Because the second NoC data unit is in the same VC as the first NoC data unit stored in FIG. 5A, the switch stores the second NoC data unit using pods indicated by the pointer 220A. Thus, the second NoC data unit is stored in the next six pods 215, which are in the same pod group as the pods 215A-215F. The pointer 220A is then updated to point at the next available pod in the pod group.

Figure 5C:
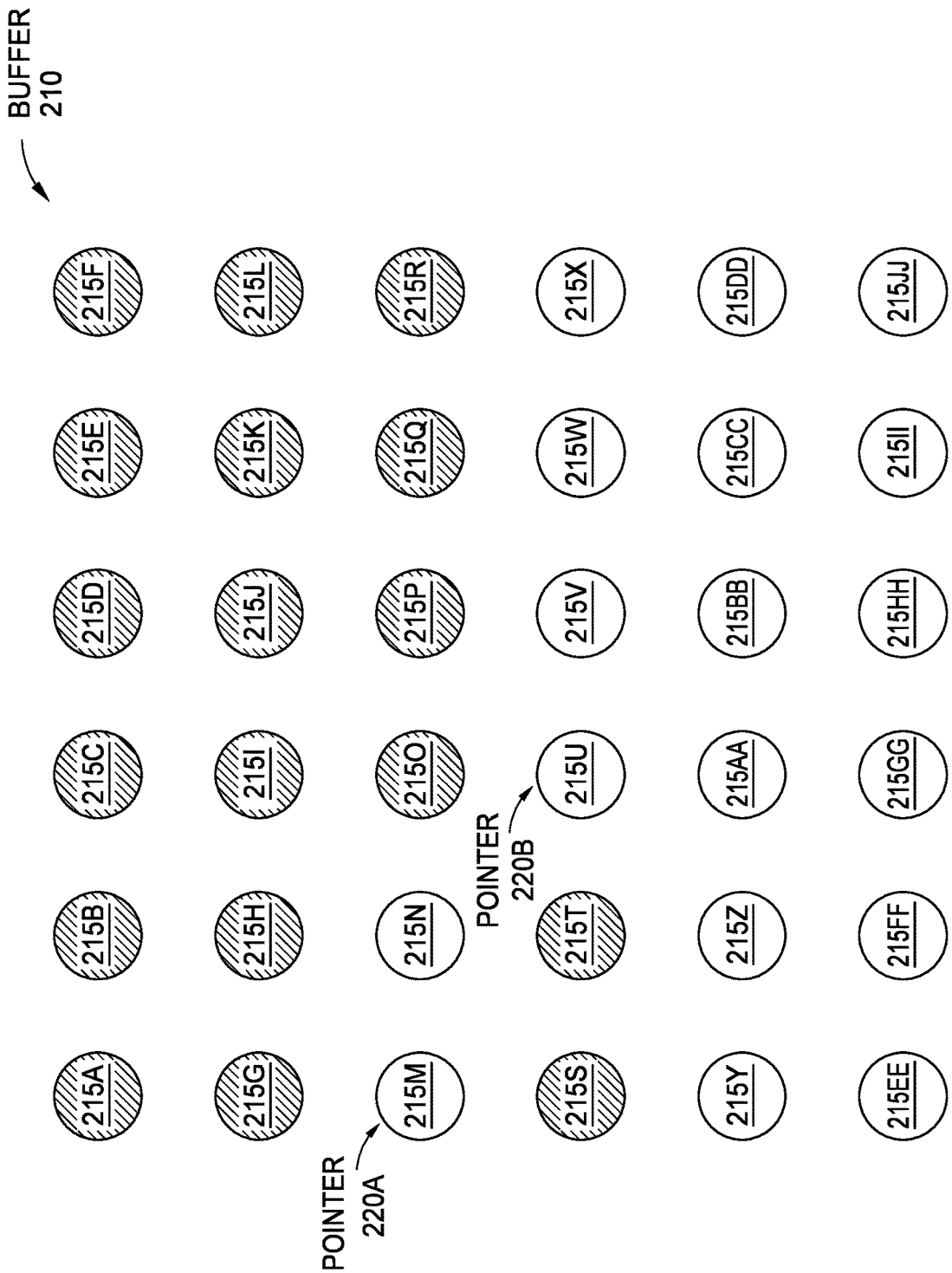

FIG. 5C illustrates receiving a third NoC data unit at the same port in the switch and storing this data unit in pods 215O-215T. The third NoC data unit is part of a different VC from the first and second NeC data units stored in FIGS. 5A and 5B. The pointer 220B points to the first available in this VC, and thus, is used to store the third NoC data unit in pods 215O-215T. The pointer 220B is then updated to point to the next available pod 215 in this VC—i.e., pod 215U.

Figure 5D:
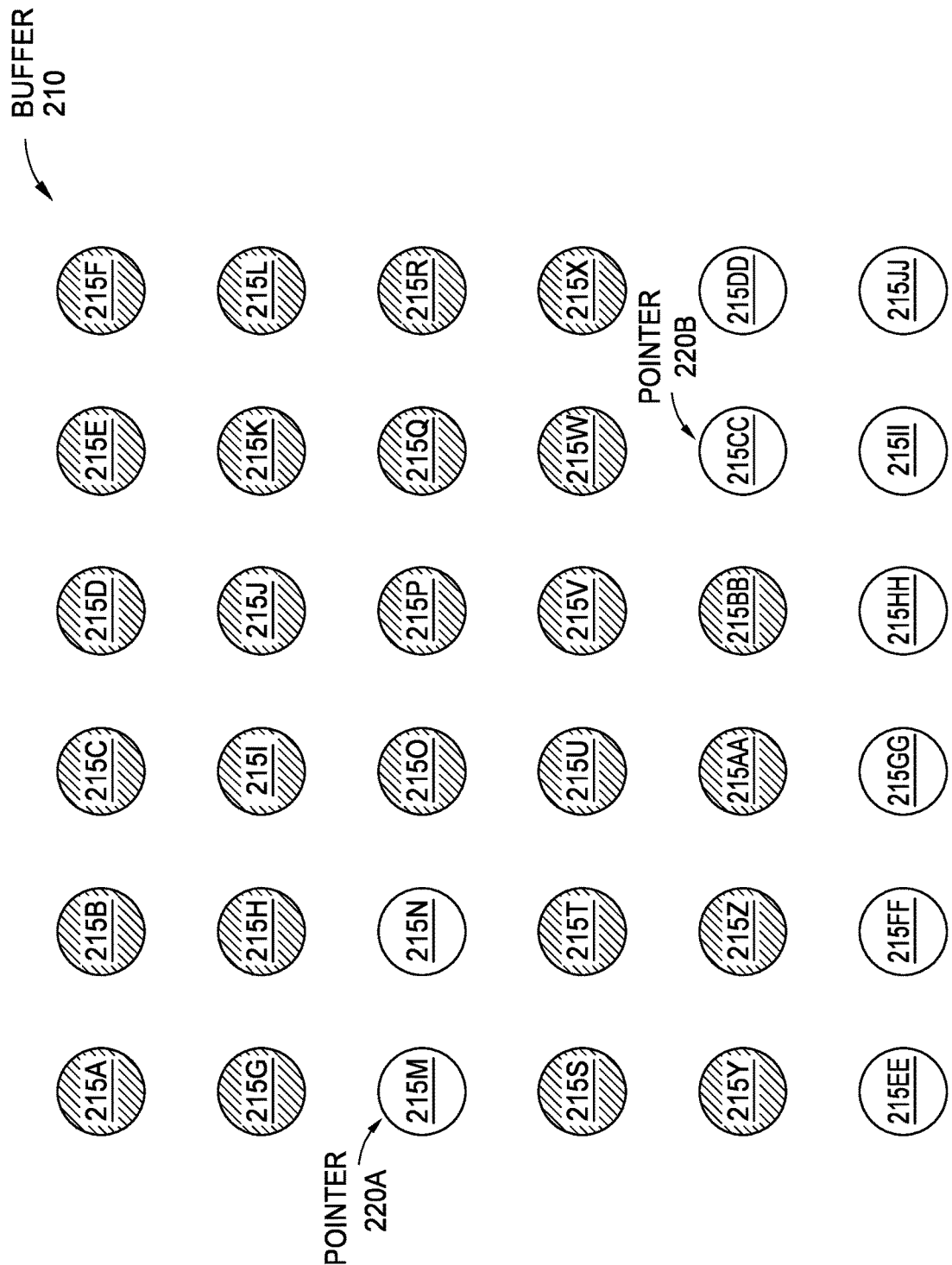

FIG. 5D illustrates receiving a fourth NoC data unit at the same port in the switch and storing this data unit in pods 215U-2158B. Because the fourth NeC data unit is in the same VC as the third NoC data unit stored in FIG. 5C, the switch stores the fourth NoC data unit using pods indicated by the pointer 220B. Thus, the fourth NoC data unit is stored in the next six pods 215, which are in the same pod group as the pods 215O-215T. The pointer 220B is then updated to point at the next available pod in the pod group.

In this manner. FIGS. 5A-5D illustrate storing NoC data units from different VC in different pod groups in the same buffer. As new NoC data units arrive, pointers 220 can be updated so the switch can track each VC separately and determine when a pod subgroup for a VC has reached its capacity.

Figure 6A:
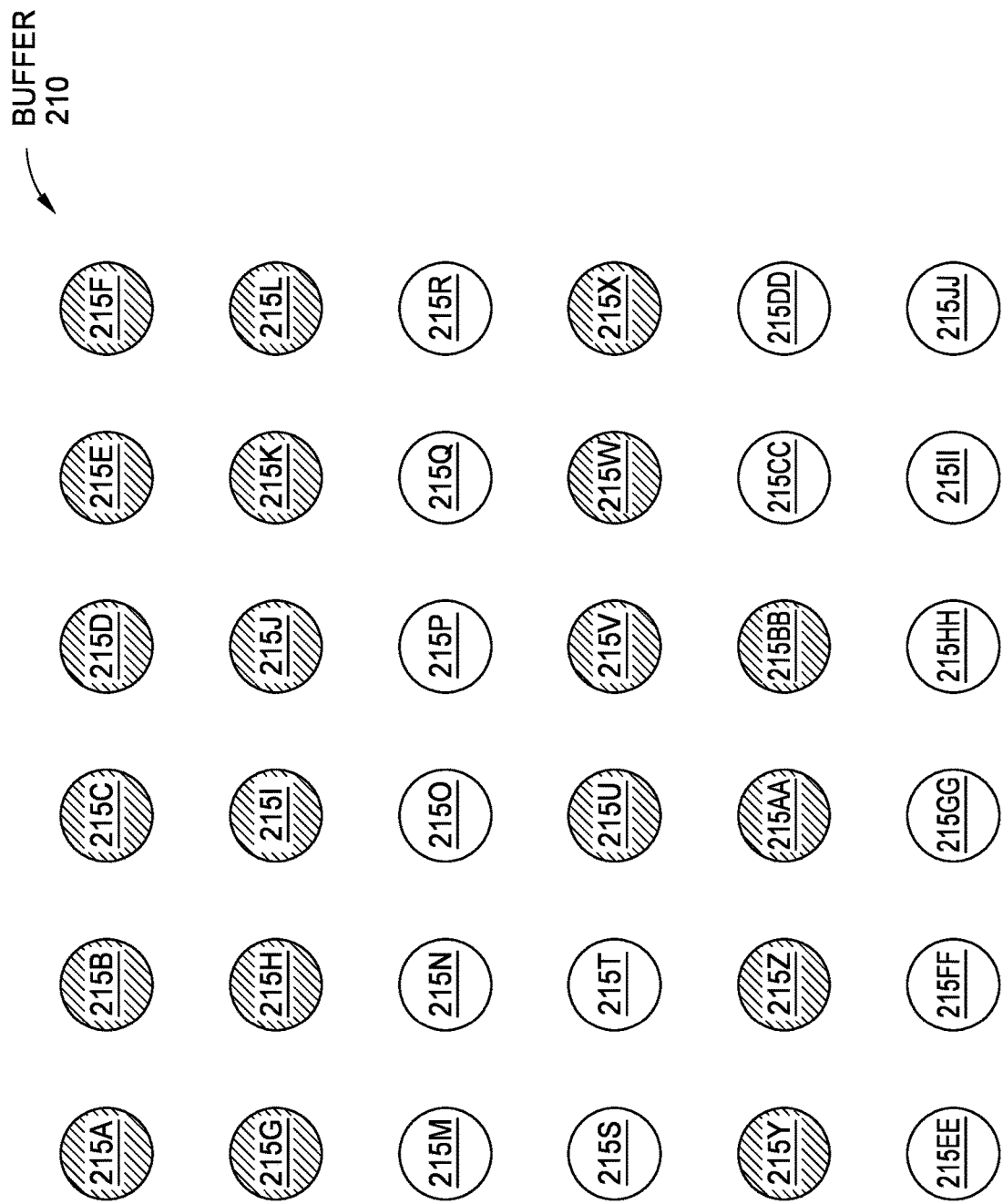
FIGS. 6A-6C illustrate reading out data units of different VCs from a buffer, according to examples.
Figure 6B:
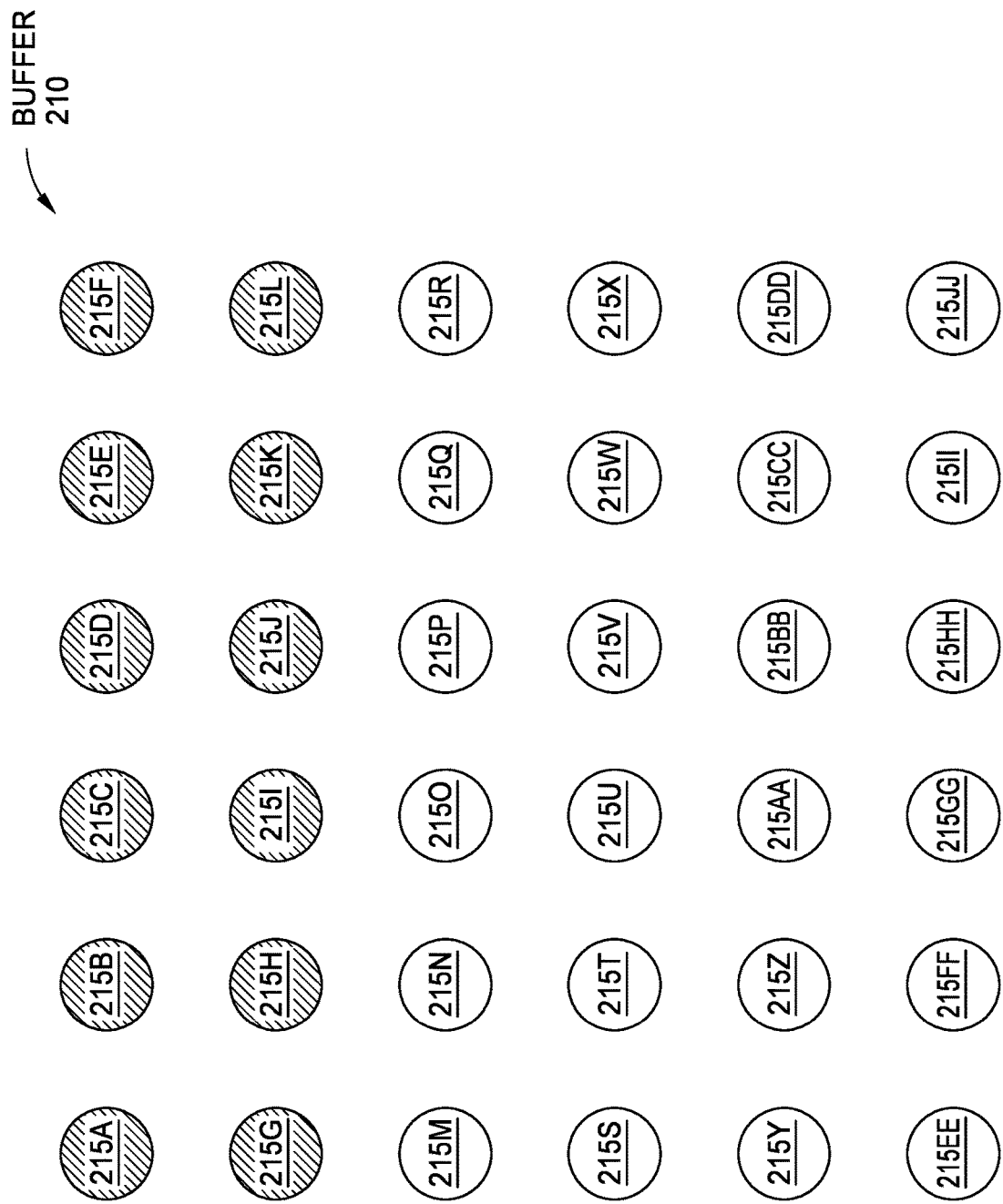
Figure 6C:
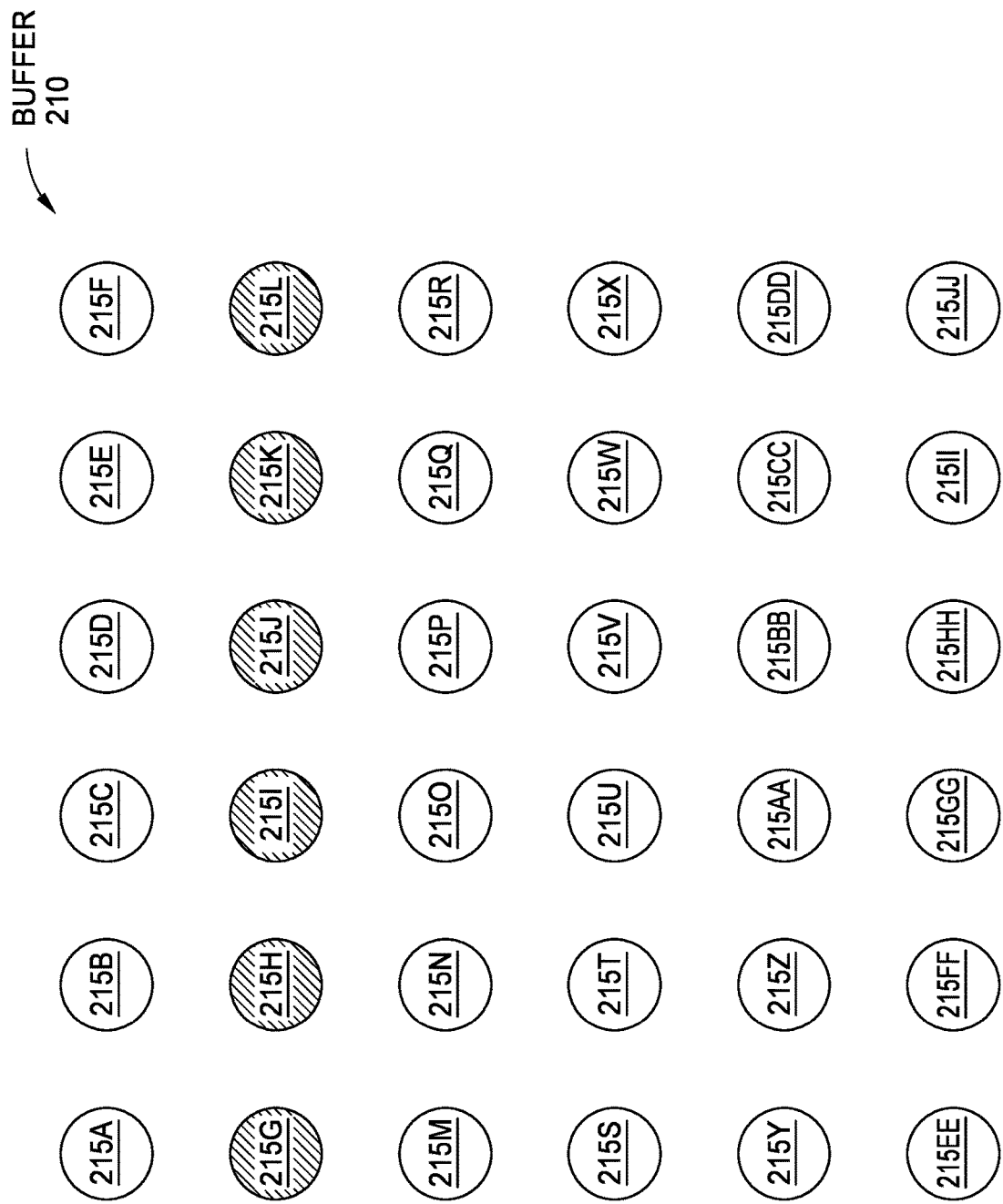

FIGS. 6A-6C illustrate reading out data units of different VCs from a buffer, according to examples. FIG. 6A illustrates reading out the third NoC data unit that was stored in the buffer 210 shown in FIG. 50. In this case, the switch is ready to forward the NoC data units stored in the VC corresponding to the pods 215O-215BB before it is ready to read out and forward the NoC data units stored in the VC corresponding to pods 215A-215L.

In this embodiment, the NoC data units in the same VC are read out in a first-in first-out (FIFO) manner. Thus, when the switch is ready to transmit a NoC data unit corresponding to the VC of the third and fourth NoC data units, the switch first forwards the third NoC data unit that was stored at the pods 215O-215T to a downstream switch (or a egress logic block).

FIG. 68 illustrates reading out the fourth NoC data unit stored at the pods 215U-215BB. Although not shown, the switch may update the pointer for this VC to point at the first pod in the pod subgroup (e.g., pod 215O). This may be done after the third NoC data unit was read out in FIG. 6A or after the fourth NoC data unit was read out in FIG. 68. Thus, if the switch receives another NoC data unit in the same VC, it is stored at the pod 215O.

FIG. 6C illustrates reading out the first NoC data unit that was stored in the buffer 210. In this case, the switch is ready to forward the NoC data units stored in the VC corresponding to the pods 215A-215L. Because the first NoC data unit was stored first in the buffer 210, it is read out before the second NoC data unit. Thus, FIG. 6C illustrates reading out the first NoC data unit stored in pods 215A-215F.

Although not shown, the second NoC data unit stored in pods 215G-215L can then be read out from the buffer 210. The switch also updates the pointer for this VC to point at the first pod in the pod subgroup (e.g., pod 215A). This may be done after the first NoC data unit was read out in FIG. 6B or after the second fourth NoC data unit is read out. Thus, if the switch receives another NoC data unit in the same VC, it is stored at the pod 215A.

Figure 7:
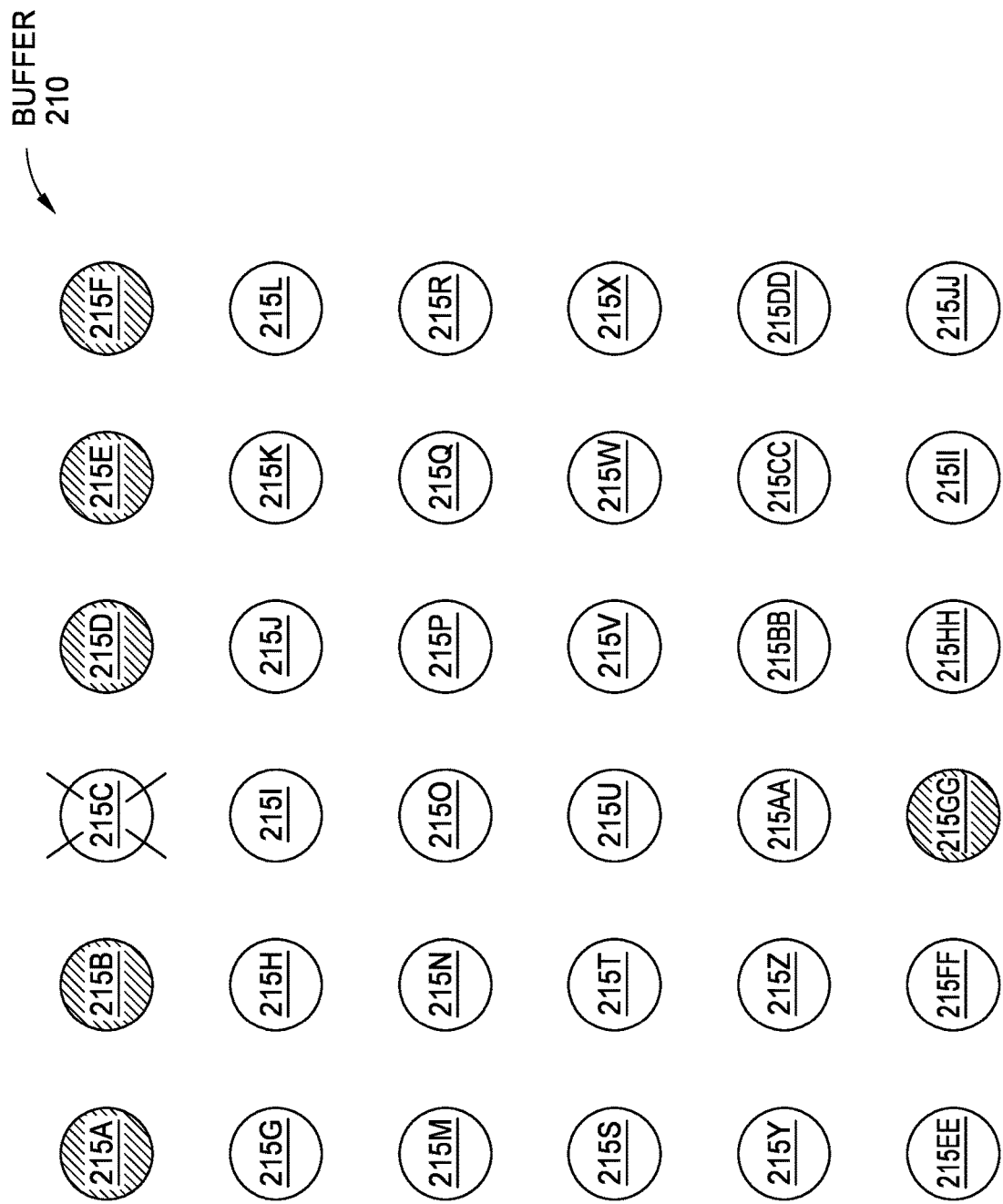
FIG. 7 illustrates using a redundant pod when a pod fails in a buffer, according to an example.

FIG. 7 illustrates using a redundant pod 215GG when a pod fails in the buffer 210, according to an example. In this example, the pod 215C has malfunctioned, such that it can no longer accurately store data. In this case, software executing on the SoC (or an external host) can update the buffer 210 so that the redundant pod 215GG is substituted into the pod group to replace the defective pod 215C. As shown, the NoC data unit is stored in the pods 215A, 215B, 215GG, 215D, 215F, and 215G.

In one embodiment, the redundant pod 215GG may not be assigned to any pod group until it is used to replace a malfunctioning pod. That is, each buffer 210 may include one or more pods 215 which are not used until a pod malfunctions, in which case the redundant pod is logically inserted into a pod group.

In one embodiment, the pods 215 may include addresses for its neighboring pods so the NoC data unit can be stored in consecutive pods (when it has more data than can be stored in a single pod 215). In this example, the software can update the addresses for the pods 215B and 215D so they point to the pod 215GG, rather than the defective pod 215C. Further, the addresses for the pod 215GG can be updated to point to the pods 215B and 215D.

Figure 8A:
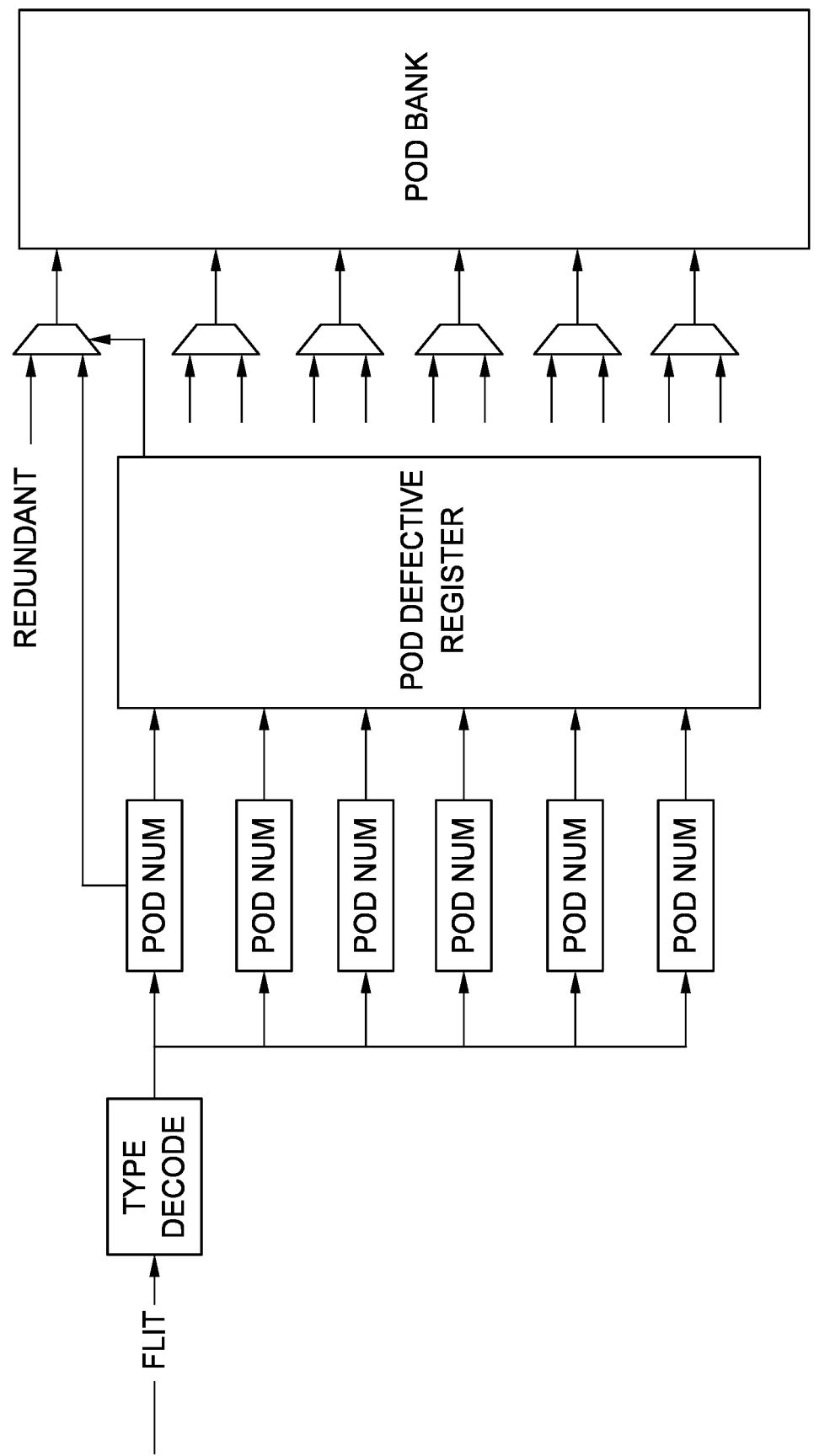
FIGS. 8A-8C illustrate different redundancy schemes, according to examples.
Figure 8B:
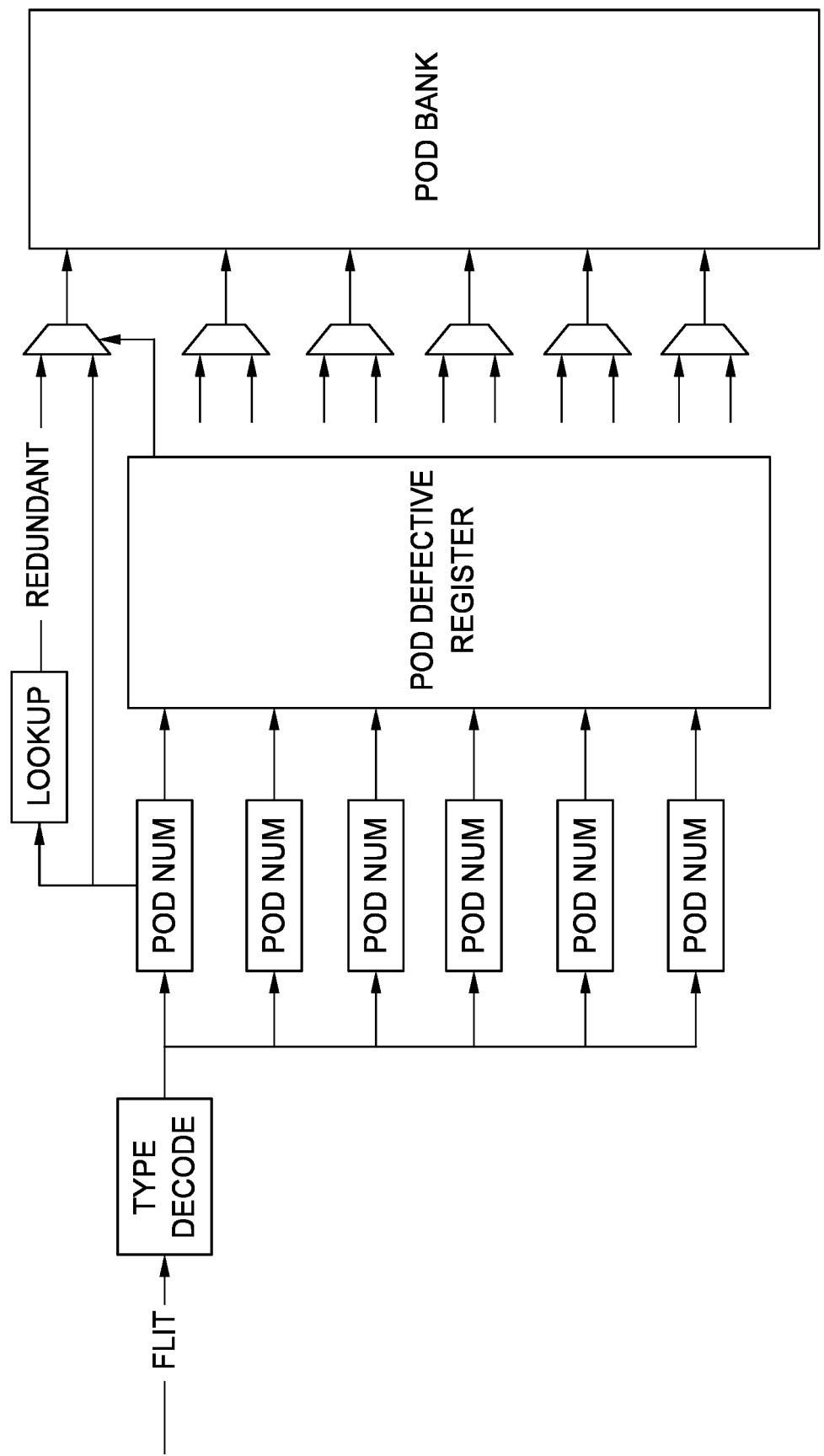
Figure 8C:
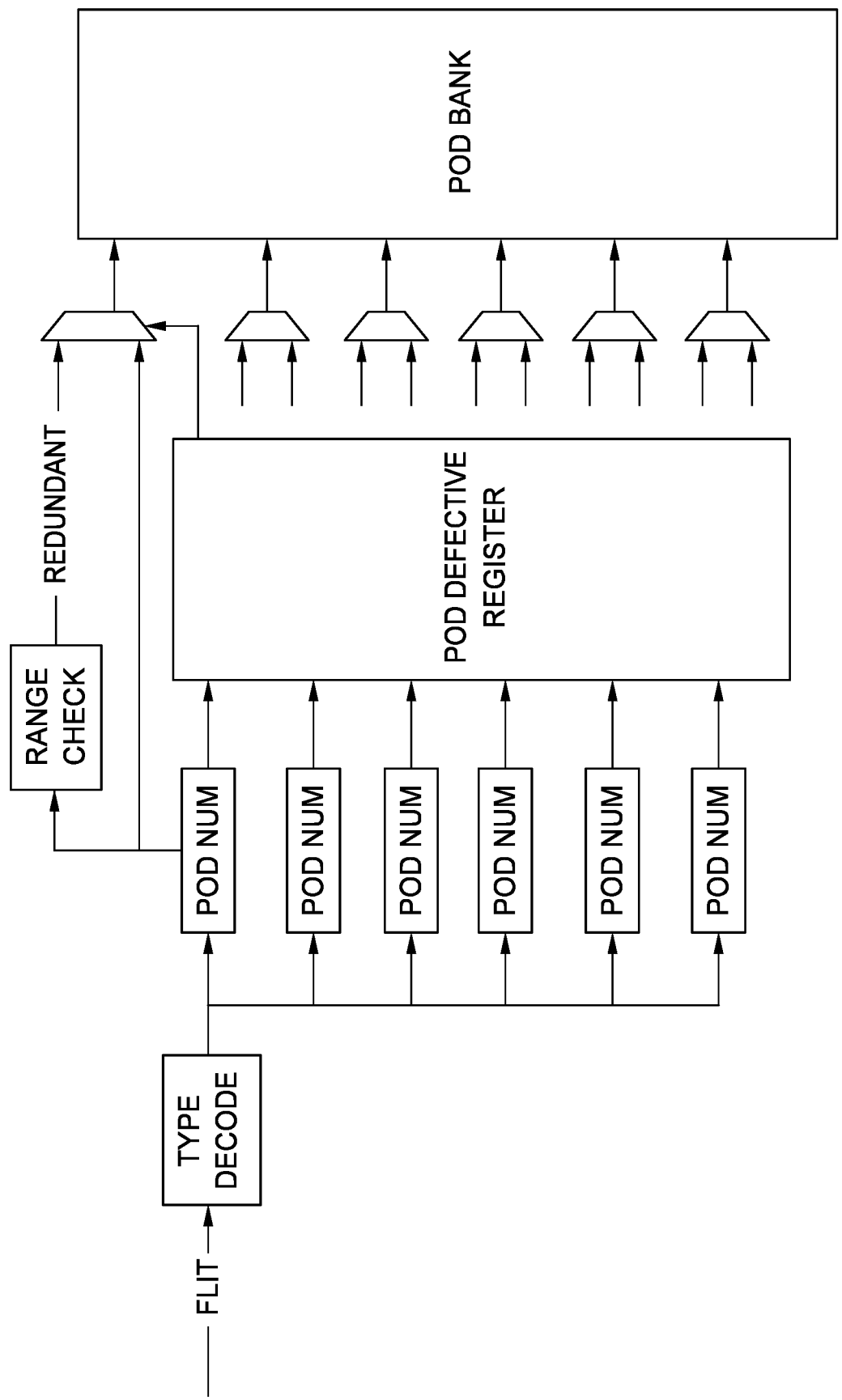

FIGS. 8A-8C illustrate different redundancy schemes, according to examples. FIG. 8A illustrates a hardware architecture where every pod group in a buffer has its own redundant pod which can be switched in when another pod in the pod group becomes defective. In order to minimize the area overhead of redundancy, each pod can have a static assignment of a redundant pod. For example, if pod number 4 fails, the redundant pod may be set up (before the device is operational or during configuration) as pod number 188. For more flexibility, the target redundant pod may be obtained from a register (e.g., a pod defective register), which will incur a lookup cost. The direct assignment provides no flexibility but is most area efficient.

FIG. 8B illustrates a full lookup option where a redundant pod can be used to replace any other pod in the buffer. The full lookup option gives the maximum flexibility but adds the lookup area.

Alternatively, in FIG. 8C, the PODs can be grouped into blocks (e.g., ranges), and each block/range can be assigned to a target redundant pod.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention, in this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:
   a first hardware circuit;
   a second hardware circuit; and
   a network on a chip (NoC) communicatively coupling the first hardware circuit and the second hardware circuit, the NoC comprising:
      a plurality of switches, each switch comprising a plurality of ports, each port comprising a buffer,
      wherein the buffer comprises a plurality of pods divided into multiple pod groups, at least a subset of the pod groups configured to be a different size, and each pod group assigned to a different virtual channel of a plurality of virtual channels based on a width of each of the plurality of virtual channels.

2. The integrated circuit of claim 1, wherein different types of NoC data units transmitted between the plurality of switches are assigned to different ones of the virtual channels.

3. The integrated circuit of claim 2, wherein the different types of NoC data units have different widths.

4. The integrated circuit of claim 3, wherein a size of each of the plurality of pods is set based on the type of the NoC data units with a smallest width.

5. The integrated circuit of claim 1, wherein wider virtual channels of the plurality of virtual channels are assigned to pod groups of the multiple pod groups having a larger number of pods.

6. The integrated circuit of claim 1, wherein the plurality of switches maintain a pointer for each of the multiple pod groups to determine when the multiple pod groups are full.

7. The integrated circuit of claim 1, wherein the buffer is non-blocking such that when a first pod group of the multiple pod groups for a first virtual channel is full a second pod group of the multiple pod groups for a second virtual channel that is not full can continue to store NoC data units.

8. The integrated circuit of claim 1, wherein the plurality of pods comprises a redundant pod that is not assigned to one of the pod groups until after a defective pod is detected.

9. A method, comprising:
   receiving a network on a chip (NoC) data unit at a port of a switch in a NoC;
   identifying a virtual channel corresponding to the NoC data unit;
   storing, in a buffer in the switch, the NoC data unit in a pod group assigned to the virtual channel, wherein the buffer comprises a plurality of pods divided into multiple pod groups, at least a subset of the pod groups configured to be a different size, and each pod group assigned to a different virtual channel of a plurality of virtual channels based on a width of each of the plurality of virtual channels; and
   updating a pointer for the pod group based on storing the NoC data unit in the pod group.

10. The method of claim 9, wherein different types of NoC data units transmitted between the plurality of switches are assigned to different ones of the virtual channels.

11. The method of claim 10, wherein the different types of NoC data units have different widths.

12. The method of claim 11, wherein a size of each of the plurality of pods is set based on a type of the NoC data units with a smallest width.

13. The method of claim 9, wherein wider virtual channels of the plurality of virtual channels are assigned to pod groups of the multiple pod groups having a larger number of pods.

14. The method of claim 9, wherein the switch maintain the pointer to determine when multiple pod group is full.

15. The method of claim 9, wherein the buffer is non-blocking such that when a first pod group of the multiple pod groups for a first virtual channel is full a second pod group of the multiple pod groups for a second virtual channel that is not full can continue to store NoC data units in the buffer.

16. The method of claim 9, further comprising:
   detecting a defective pod in one of the multiple pod groups; and
   assigning a redundant pod to replace the defective pod, wherein the redundant pod was not assigned to one of the multiple pod groups before the defective pod was detected.

17. An integrated circuit, comprising:
   a first hardware circuit;
   a second hardware circuit; and
   a network on a chip (NoC) communicatively coupling the first hardware circuit and the second hardware circuit, the NoC comprising:
      a plurality of switches, each switch comprising a plurality of ports, each port having a buffer,
      wherein the buffer comprises a plurality of pods divided into multiple pod groups assigned to different types of NoC data units, at least a subset of the pod groups configured to be a different size, and each pod group assigned to a different virtual channel of a plurality of virtual channels based on a width of each of the plurality of virtual channels.

18. The integrated circuit of claim 17, wherein wider virtual channels of the plurality of virtual channels are assigned to pod groups of the multiple pod groups having a larger number of pods.

19. The integrated circuit of claim 17, wherein narrower virtual channels of the plurality of virtual channels are assigned to pod groups of the multiple pod groups having a smaller number of pods.

20. The integrated circuit of claim 17, wherein a size of each of the plurality of pods is set based on the type of the NoC data units with a smallest width.

* * * * *